(12) United States Patent
Ogura et al.

(10) Patent No.: US 7,861,686 B2
(45) Date of Patent: Jan. 4, 2011

(54) FUEL INJECTION CONTROL APPARATUS AND FUEL INJECTION CONTROL METHOD

(75) Inventors: Seiji Ogura, Susono (JP); Hisashi Ohki, Numadu (JP); Takashi Koyama, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/528,865

(22) PCT Filed: Jun. 11, 2008

(86) PCT No.: PCT/IB2008/001508

§ 371 (c)(1),
(2), (4) Date: Aug. 27, 2009

(87) PCT Pub. No.: WO2008/152480

PCT Pub. Date: Dec. 18, 2008

(65) Prior Publication Data

US 2010/0108024 A1  May 6, 2010

(30) Foreign Application Priority Data

Jun. 12, 2007  (JP) ............................. 2007-155604

(51) Int. Cl.
  *F02B 3/10*  (2006.01)
(52) U.S. Cl. .................... 123/299; 123/435; 123/436; 123/300
(58) Field of Classification Search ................. 123/299, 123/300, 435, 436, 481, 492, 493
See application file for complete search history.

(56) References Cited

U.S. PATENT DOCUMENTS

| 6,688,279 | B2 * | 2/2004 | Ishikawa et al. | 123/299 |
| 6,962,140 | B1 * | 11/2005 | Nakai et al. | 123/436 |
| 7,703,440 | B2 * | 4/2010 | Hatano et al. | 123/435 |

FOREIGN PATENT DOCUMENTS

| DE | 19923299 A1 | 11/2000 |
| EP | 1081365 A2 | 3/2001 |
| EP | 1 344 922 A2 * | 3/2003 |
| EP | 1344922 A2 | 9/2003 |
| EP | 1365136 A2 | 11/2003 |
| EP | 1653070 A2 | 5/2006 |
| EP | 1707785 A2 | 10/2006 |
| EP | 1741911 A1 | 1/2007 |
| JP | 60017250 A | 1/1985 |
| JP | 11093735 A | 4/1999 |
| JP | 2001193463 A | 7/2001 |
| JP | 2003-269229 * | 9/2003 |
| JP | 2004027939 A | 1/2004 |
| JP | 2006274969 A | 10/2006 |

* cited by examiner

*Primary Examiner*—Hai H Huynh
(74) *Attorney, Agent, or Firm*—Gifford, Krass, Sprinkle, Anderson & Citkowski, P.C.

(57) ABSTRACT

According to an internal combustion engine fuel injection control apparatus and control method, when an operating region of the engine shifts from a fuel cut region in which no fuel is injected to a low load region in which a small amount of fuel is injected, or visa versa, at least one pilot injection is executed ahead of a main injection in the low load region, and the number of pilot injections is determined according to the engine coolant temperature. This injection control makes it possible to ensure drivability while suppressing the amount of HC produced.

27 Claims, 9 Drawing Sheets

| LOW COOLANT TEMPERATURE | MEDIUM COOLANT TEMPERATURE | HIGH COOLANT TEMPERATURE |
|---|---|---|
| Tw < A | A < Tw < B | B < Tw |
| TRIPLE PILOT INJECTION | DOUBLE PILOT INJECTION | SINGLE PILOT INJECTION |

| LOW RPM | MEDIUM RPM | HIGH RPM |
|---|---|---|
| 0 < Ne < C | C < Ne < D | D < Ne |
| SINGLE PILOT INJECTION | DOUBLE PILOT INJECTION | TRIPLE PILOT INJECTION |

FIG. 7

| LOW LOAD | MEDIUM LOAD | HIGH LOAD |
|---|---|---|
| 0 > TQ > x | x > TQ > y | y > TQ |
| SINGLE PILOT INJECTION | DOUBLE PILOT INJECTION | TRIPLE PILOT INJECTION |

FIG.8

| 1ST GEAR | 2ND GEAR | 3RD, 4TH, 5TH GEAR |
|---|---|---|
| SINGLE PILOT INJECTION | DOUBLE PILOT INJECTION | TRIPLE PILOT INJECTION |

FUEL INJECTION CONTROL APPARATUS AND FUEL INJECTION CONTROL METHOD

BACKGROUND OF THE INVENTION

1. Field of the Invention

The invention relates to a fuel injection control apparatus and a fuel injection control method for a compression ignition internal combustion engine.

2. Description of the Related Art

Japanese Patent Application Publication No. 60-017250 (JP-A-60-017250), Japanese Patent Application Publication No. 2001-193463 (JP-A-2001-193463), Japanese Patent Application Publication No. 2004-027939 (JP-A-2004-027939), Japanese Patent Application Publication No. 2006-274969 (JP-A-2006-274969), and Japanese Patent Application Publication No. 11-93735 (JP-A-11-93735) describe a fuel injection control apparatus for a compression ignition internal combustion engine such as a diesel engine, which injects high pressure fuel stored in a common rail a plurality of times into each cylinder during one combustion stroke.

In this kind of a diesel engine, only a small amount of fuel is injected when the engine is operating in the low load region so the temperature in the cylinders tends to fall. If the temperature in the cylinders (hereinafter also referred to as "cylinder temperature") falls, combustion may become unstable, leading to an increase in the amount of hydrocarbons (HC) that are produced. One way to minimize the amount of HC produced is to inhibit the cylinder temperature from dropping by performing a pilot injection by which a small amount of fuel is injected ahead of the main injection. Also, performing a pilot injection over a series of injections (i.e., performing a plurality of pilot injections before one main injection) enables a drop in the cylinder temperature to be effectively suppressed.

However, when such a pilot injection is performed right after a fuel cut is executed, for example, torque shock may be produced when the operating region of the engine shifts from the low load region to the fuel cut region or from the fuel cut region to the low load region depending on the number of pilot injections, and this torque shock may adversely affect drivability.

SUMMARY OF THE INVENTION

This invention thus provides a fuel injection control apparatus and fuel injection control method for a compression ignition internal combustion engine, which is capable of ensuring drivability while suppressing the amount of HC produced.

Thus, a first aspect of the invention relates to a fuel injection control apparatus for a compression ignition internal combustion engine, which can perform a fuel injection divided into a plurality of injections. This fuel injection control apparatus includes a pilot injection control apparatus which, when an operating region of the internal combustion engine shifts from a fuel cut region in which no fuel is injected to a low load region in which a small amount of fuel is injected, or visa versa, executes at least one pilot injection ahead of a main injection in the low load region. The pilot injection control apparatus determines the number of pilot injections according to the state of the internal combustion engine or the state of a transmission.

Also, a second aspect of the invention relates to a fuel injection control method of a compression ignition internal combustion engine, which can perform a fuel injection divided into a plurality of injections. This control method includes executing, when an operating region of the internal combustion engine shifts from a fuel cut region in which no fuel is injected to a low load region in which a small amount of fuel is injected, or visa versa, at least one pilot injection ahead of a main injection in the low load region; determining the number of pilot injections according to the state of the internal combustion engine or the state of a transmission; and executing the main injection after the determined number of pilot injections has been executed.

The fuel injection control apparatus and fuel injection control method described above reduce the amount of HC produced by performing a pilot injection in the low load region. Also, the appropriate number of pilot injections is determined according to the state of the internal combustion engine or the transmission. Therefore, it is possible to set the appropriate number of pilot injections in order to reduce the amount of HC in the exhaust gas discharged from the internal combustion engine, as well as suppress torque shock that occurs following a shift in the operating region of the internal combustion engine so drivability can be maintained.

Also, in the foregoing fuel injection control apparatus and fuel injection control method, the number of pilot injections may be determined according to at least one from among an engine temperature, an engine speed, and an engine load.

Here, the number of pilot injections may be set larger the lower the engine temperature is. Also, the number of pilot injections may be set larger the higher the engine speed is. Furthermore, the number of pilot injections may be set larger the larger the engine load.

According to the fuel injection control apparatus and fuel injection control method described above, by determining the number of pilot injections according to the engine temperature, when the engine temperature is relatively low or when the engine speed is high or the engine load is large, it can be determined that the friction of the engine is large so the number of pilot injections is set relatively large. Also, when the engine temperature is relatively high or when the engine speed is low or the engine load is small, it can be determined that the friction of the engine is relatively small so the number of pilot injections is set relatively small. Therefore, torque shock that occurs following a shift in the operating region of the engine can be suppressed, thus enabling drivability to be maintained, while the amount of HC produced can be reduced.

Also, in the foregoing fuel injection control apparatus and fuel injection control method, the engine temperature may be estimated according to at least one from among an engine coolant temperature, an engine lubrication oil temperature, and an outside air temperature.

Also, the fuel injection control apparatus may also include a variable nozzle control apparatus that controls an opening amount of a variable nozzle of a supercharger to increase back pressure when the operating region of the internal combustion engine shifts. Likewise, the control method may also include controlling an opening amount of a variable nozzle of a supercharger to increase back pressure when the operating region of the internal combustion engine shifts.

The fuel injection control apparatus and fuel injection control method described above reduce the amount of HC produced by executing a pilot injection in the low load region. Also, when the number of pilot injections is set relatively large, torque shock can be suppressed by controlling the opening amount of the variable nozzle to increase the back pressure.

Also, in the foregoing fuel injection control apparatus and fuel injection control method described above, the number of pilot injections may be determined according to a gear ratio of the transmission.

Here, the number of pilot injections may be set larger the smaller the gear ratio of the transmission is.

Because a driver will feel less torque shock when the gear ratio is small the fuel injection control apparatus and control method described above can relatively increase the number of pilot injections when the gear ratio is small. Also, torque shock is felt more easily when the gear ratio is large so torque shock can be suppressed by relatively reducing the number of pilot injections.

Also, in the foregoing fuel injection control apparatus and fuel injection control method, the injection quantity of each pilot injection may be set to the minimum injectable quantity.

Also, in the foregoing fuel injection control apparatus and fuel injection control method described above, the injection timing of a main injection or a pilot injection, which is executed immediately following the pilot injection, may be set to a timing at which the amount of HC produced is minimal, taking into account the injection timing of the pilot injection that is executed right before the main injection or the pilot injection. As a result, the amount of HC produced can be reduced.

Accordingly, the invention provides a fuel injection control apparatus and fuel injection control method for a compression ignition internal combustion engine, which can ensure drivability while suppressing the amount of HC that is produced.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in greater detail with reference to example embodiments.

Figure 1:
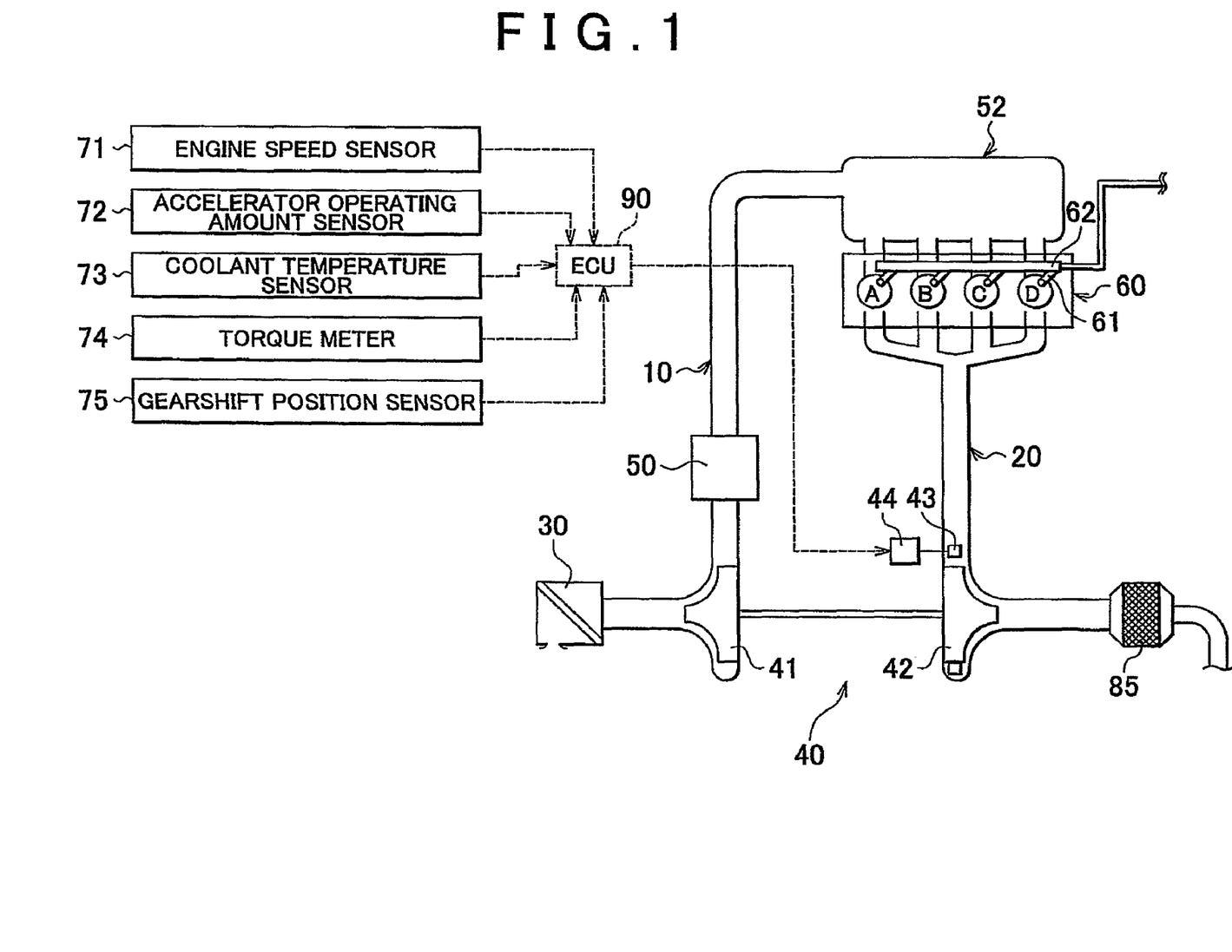
FIG. 1 is a block diagram of an engine system according to a first example embodiment of the invention.

FIG. 1 is a block diagram of an engine system according to a first example embodiment of the invention. The engine system includes an intake passage 10, an exhaust passage 20, an air cleaner 30, a turbocharger 40, an intercooler 50, a surge tank 52, a diesel engine 60, a filter 85, and an ECU (electronic control unit) 90, and the like.

The ECU 90 includes a CPU (Central Processing Unit), ROM (Read Only Memory), and RAM (Random Access Memory) and the like, and controls the operation of various devices. The ECU 90 is also able to execute a routine for determining the number of pilot injections, which will be described later, according to a control program stored in the ROM. Various data obtained during the process of executing the routine for determining the number of pilot injections is temporarily stored in the RAM.

First, intake air passes through the air cleaner 30 and is led to a compressor 41 of the turbocharger 40, where it is pressurized. The pressurized air then flows through the intercooler 50 where it is cooled. Next the air which has been pressurized and cooled is supplied to a surge tank 52 from which it is then distributed to cylinders A to D via intake passage branches. Each of these cylinders A to D is provided with a fuel injector 61 which injects fuel stored under high pressure in a common rail into the corresponding cylinder A to D.

The injection timing of the fuel injectors 61 is controlled by the ECU 90. More specifically, the ECU 90 controls the injection quantity and injection timing of a main injection, as well as the injection quantity, injection timing, and the number of injections of a pilot injection whereby fuel is injected ahead of the main injection, by controlling the operation of the fuel injectors 61.

Also, the ECU 90 receives detection signals from various sensors and the like, including an engine speed sensor 71 that detects the rotation speed Ne of a crankshaft, not shown, of the diesel engine 60 (this rotation speed Ne corresponds to the engine speed and will therefore hereinafter be referred to as the "engine speed Ne"), an accelerator operating amount sensor 72 that detects the accelerator operating amount, a coolant temperature sensor 73 that detects the temperature of coolant used to cool the diesel engine 60, a torque meter 74 that detects the load of the diesel engine 60, and a gearshift position sensor 75 (gear ratio detecting means) that detects the position of a gearshift of a transmission, not shown. The ECU 90 is able to detect the current engine speed Ne, the engine temperature, the engine load, and the gear ratio, and the like from the detection signals that it receives from these sensors.

The cylinders A to D are communicated with an exhaust passage 20. Exhaust gas discharged to the exhaust passage 20 is sent to a turbine 42. After passing through the turbine 42, the exhaust gas then passes through a filter 85 carrying an exhaust gas control catalyst. The exhaust gas is purified by this filter and then discharged.

A variable nozzle 43 for variably changing the flowrate of exhaust gas flowing into the turbine 42 is arranged in an inlet nozzle portion of the turbine 42. The operation of this variable nozzle 43 is controlled by an actuator 44 that controls the opening amount of the variable nozzle. The operation of this actuator 44 is controlled by output from the ECU 90.

When the operating region of the engine shifts from a fuel cut region in which no fuel is injected to a light load region in which only a small amount of fuel is injected or visa versa, i.e., from the light load region to the fuel cut region, the ECU 90 executes at least one pilot injection ahead of the main injection in the light load region and determines the number of pilot injections based on a predetermined condition. This routine for determining the number of pilot injections will be described below.

Figure 2:
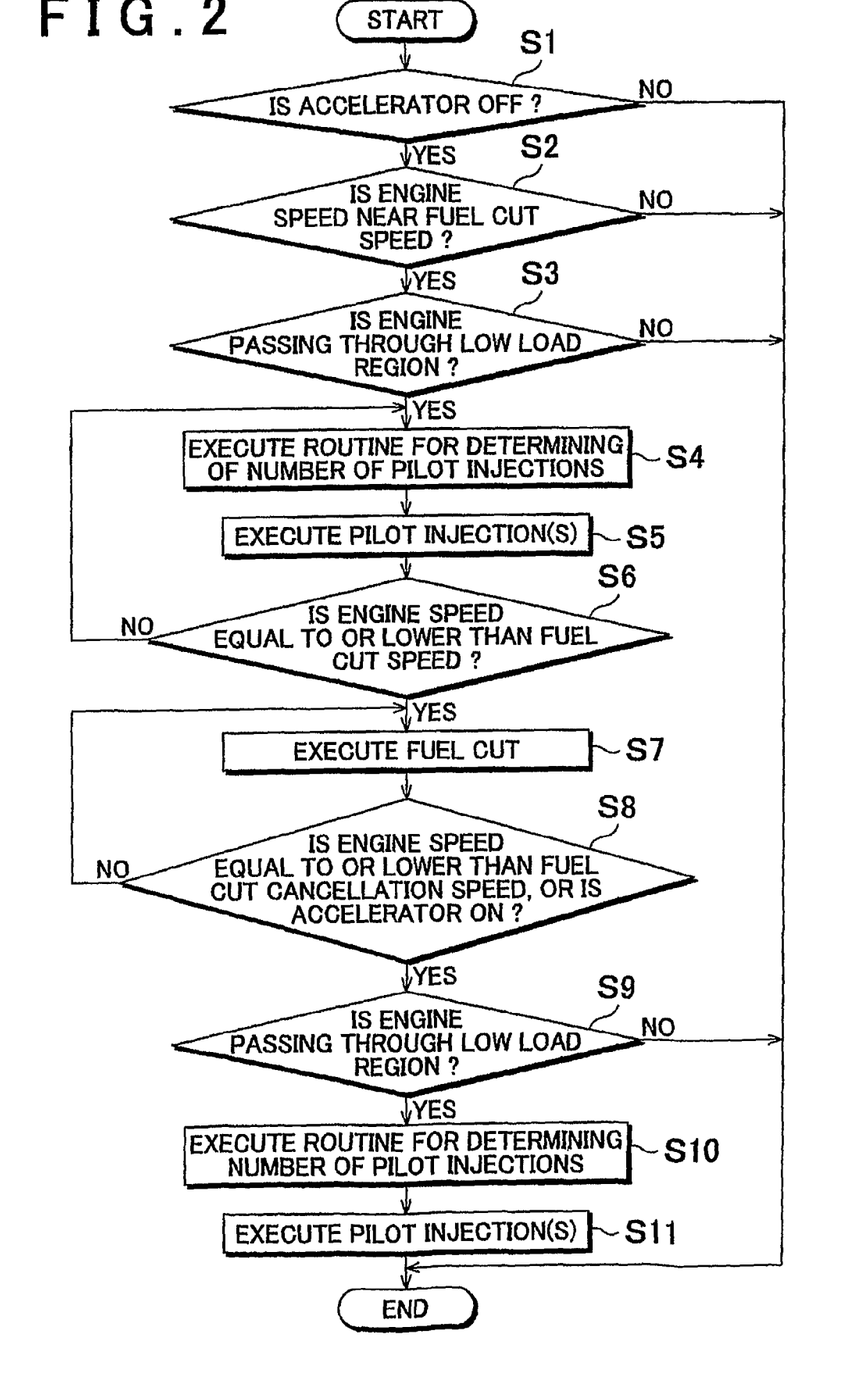
FIG. 2 is a flowchart illustrating one example of a routine for determining the number of pilot injections, which is executed by an ECU.

FIG. 2 is a flowchart illustrating one example of the routine for determining the number of pilot injections, which is executed by the ECU 90. First, the ECU 90 determines whether the accelerator is off based on the output from the accelerator operating amount sensor 72 (step S1). The accelerator is off when the accelerator operating amount is zero. If the determination is no, then this cycle of the routine ends.

If, on the other hand, the determination is yes, the ECU 90 determines based on the output from the engine speed sensor 71 whether the current engine speed Ne is close to a fuel cut speed at which a fuel cut is executed (step S2). If the determination is no, this cycle of the routine ends.

If, on the other hand, the determination is yes, the ECU 90 then determines based on the output from the torque meter 73 whether the engine is passing through the low load region (step S3). If the determination is no, this cycle of the routine ends.

If, on the other hand, the determination is yes, then the ECU 90 executes the routine for determining the number of pilot injections (step S4). This routine for determining the number of pilot injections will be described in detail later.

Next, the ECU 90 executes the number of pilot injections that were determined in step S4 (step S5). As a result, the pilot injections are performed in the low load region. Then the ECU 90 determines whether the engine speed Ne is equal to or lower than the fuel cut speed (step S6). If the determination is no, then steps S4 and S5 are executed again.

If, on the other hand, the determination is yes, the ECU 90 executes a fuel cut (step 57). In this way, the ECU 90 executes a pilot injection and then shifts the operating region of the engine from the low load region to the fuel cut region in which no fuel is injected.

Next, the ECU 90 determines whether the current engine speed Ne is equal to or less than a fuel cut cancellation speed at which fuel starts to be supplied again after a fuel cut, based on the output from the engine speed sensor 71, or whether fuel has started to be supplied again in response to a command from the accelerator operating amount sensor 73 (i.e., whether the accelerator has been turned on) (step S8). If the determination is no, the fuel cut continues to be executed.

If, on the other hand, the determination is yes, then the ECU 90 determines whether the engine is passing through the low load region (step S9). If the determination is no, this cycle of the routine ends. If, on the other hand, the determination is yes, the ECU 90 determines the number of pilot injections to be executed (step S10). Incidentally, this step is the same as step S4 described above, and will be described in detail later.

Next, the ECU 90 executes the number of pilot injections determined in step S10 (step S11). In this way, the ECU 90 shifts the operating region of the engine from the fuel cut region in which no fuel is injected to the low load region and executes the pilot injections.

Figure 3:
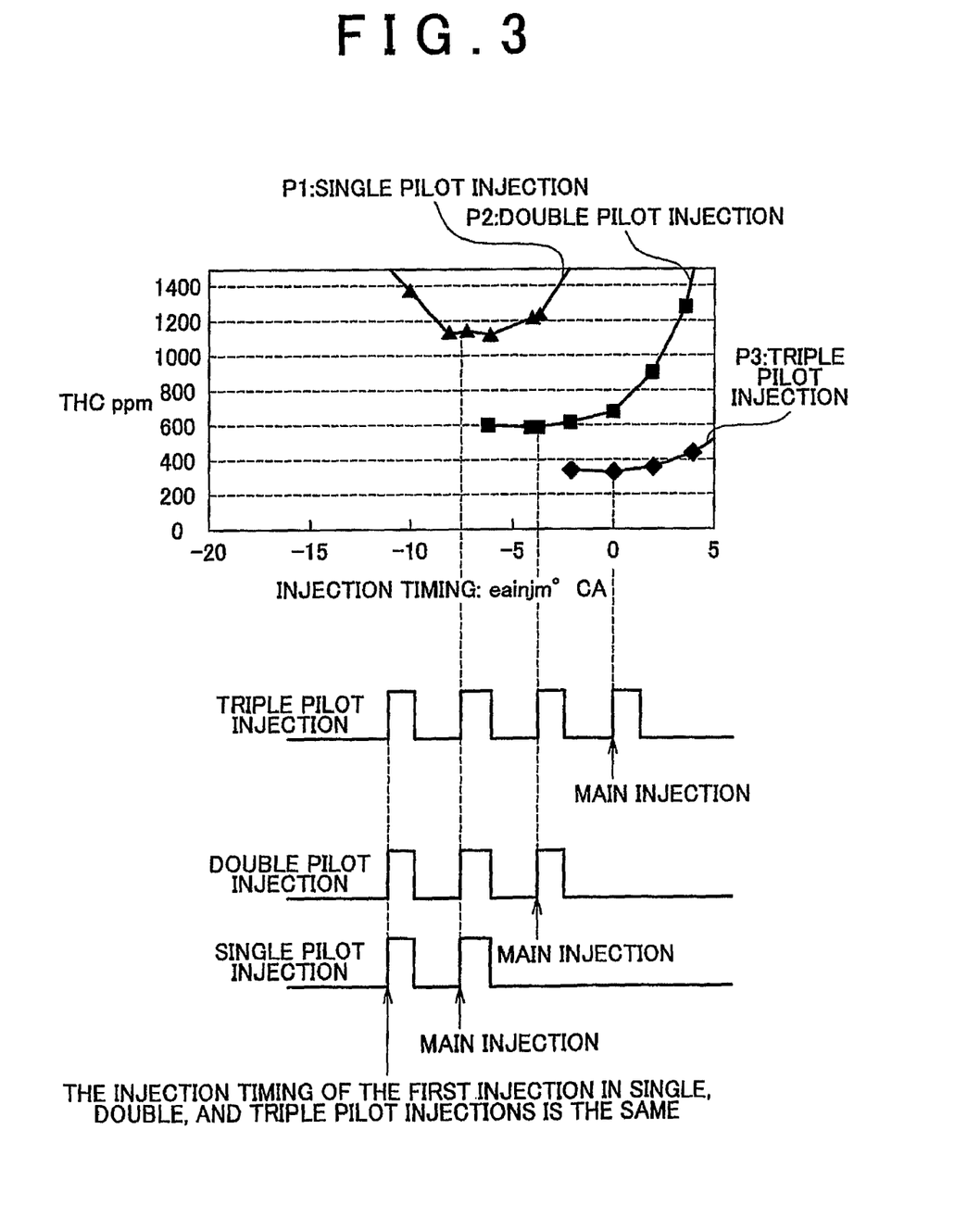
FIG. 3 is a graph showing the injection timing of a main injection and a pilot injection(s) for single, double, and triple pilot injections.

Next, the number of pilot injections, the injection timing, and injection quantity will be described. FIG. 3 is a graph showing the injection timing of both a main injection and a pilot injection(s) for single, double, and triple pilot injections which will be described below.

The upper portion of FIG. 3 is a graph with a vertical axis that represents the total amount of hydrocarbons (THC) and a horizontal axis that represents the engine crank angle. The piston, not shown, is at top dead center (TDC) when the crank angle is 0°. Also, the graph in FIG. 3 is a graph which maps the amount of THC produced during a test under conditions in which the engine is at a low temperature and the atmospheric pressure is a low pressure that is lower than the normal atmospheric pressure. A low pressure in this case refers to atmospheric pressure at an altitude of approximately 3000 meters. Also, a low engine temperature refers to an engine coolant temperature Tw of approximately 25° C.

In this case, the fuel injector 61 is able to perform a single, double, or triple pilot injection during one combustion stroke in response to a control signal from the ECU 90. The single pilot injection includes one pilot injection followed by a single main injection. The double pilot injection includes two pilot injections followed by a single main injection, and the triple pilot injection includes three pilot injections followed by a single main injection.

The injection timing of the first pilot injection in the single, double, and triple pilot injections is set to be the same and is advanced approximately 12°. Also, the fuel injection quantity of each pilot injection is set to the minimum injectable fuel injection quantity. Further, the fuel injection quantity of the main injection is also set to be the minimum injectable fuel injection quantity.

The graph in the upper portion of FIG. 3 has three curves P1, P2, and P3. Curve P1 maps out the change in the amount of THC produced when the injection timing of the main injection is changed after the first pilot injection is executed. In this case, the injection timing of the main injection is set so that the amount of THC produced is minimal. More specifically, the injection timing of the main injection is set to a timing that is advanced approximately 7.5°. The pilot injection and the main injection of the single pilot injection are executed at these timings.

Curve P2 maps out the change in the amount of THC produced when the injection timing of the main injection is changed after the first and second pilot injections are executed. Also, with the curve P2, the injection timing of the second pilot injection matches the injection timing of the main injection at which the amount of THC produced is minimal shown by curve P1.

As shown by curve P2, the injection timing of the main injection is set to a timing that is advanced approximately 4° at which the amount of THC produced is minimal. The pilot injections and the main injection of the double pilot injection are executed at these timings.

Curve P3 maps out the change in the amount of THC produced when the injection timing of the main injection is changed after the first, second, and third pilot injections are executed. Also, with the curve P3, the injection timing of the second pilot injection matches the injection timing of the main injection at which the amount of THC produced is minimal shown by curve P1, and the injection timing of the third pilot injection matches the injection timing of the main injection at which the amount of THC produced is minimal shown by curve P2.

As shown by curve P3, the injection timing of the main injection is set to a timing that substantially matches the timing at which the piston, not shown, reaches TDC which is when the amount of THC produced is minimal. The pilot injections and the main injection of the triple pilot injection are executed at these timings.

As shown in the graph in FIG. 3, more pilot injections result in less THC produced. This is because the temperature of the area around where the fuel is sprayed can be kept high, which suppresses the production of THC.

As described above, the injection quantities of the pilot injections are set to the minimum injectable quantities, so fuel consumption can be suppressed even if the number of pilot injections is increased.

Also, with any of the single, double, or triple pilot injections, the injection timing of the main injection is set to a timing at which the amount of HC produced is minimal, taking into account the injection timing of the pilot injection executed right before the main injection. Also, the injection timing of the pilot injection(s) other than the first pilot injection in the double or triple pilot injection is also set to a timing at which the amount of HC produced is minimal, taking into account the injection timing of the pilot injection executed right before the main injection. As a result, the amount of HC produced can be reduced.

Figure 4A:
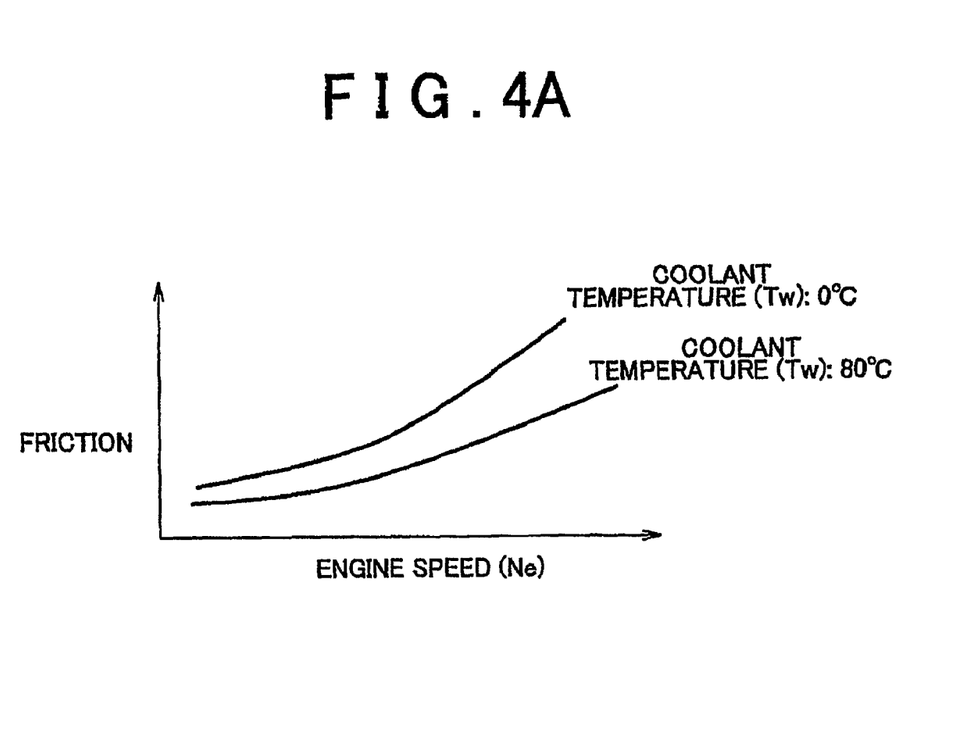
FIGS. 4A and 4B are views showing a case in which the number of pilot injections is determined according to the engine coolant temperature.
Figure 4B:
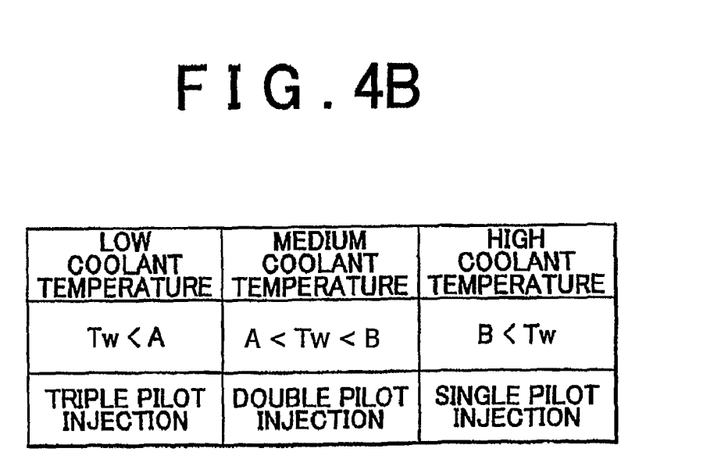

Next, the routine for determining the number of pilot injections, which is the process in steps S4 and S10 in FIG. 2, will be described in detail. FIGS. 4A and 4B are views showing a case in which the number of pilot injections is determined according to the engine coolant temperature Tw. FIG. 4A is a graph showing the relationship between the friction of the diesel engine 60 and the engine speed Ne for two different engine coolant temperatures Tw, i.e., 0° C. and 80° C. As shown by the graph, the friction increases more at the lower coolant temperature Tw. This is because when the coolant temperature Tw is low, i.e., when the temperature of the diesel engine 60 is low, the viscosity of the lubrication oil is high so friction increases.

FIG. 4B is a chart showing the number of pilot injections determined according to the engine coolant temperature Tw. In steps S4 and S10 in FIG. 2, the ECU 90 determines the number of pilot injections as follows. If the engine coolant temperature Tw is lower than A, the ECU 90 determines the coolant temperature Tw to be low and sets the number of pilot injections to three. If the engine coolant temperature Tw is higher than A but lower than B, the ECU 90 determines the coolant temperature Tw to be medium and sets the number of pilot injections to two. If the engine coolant temperature Tw is higher than B, the ECU 90 determines the coolant temperature Tw to be high and sets the number of pilot injections to one. Incidentally, A is a reference temperature for determining whether the coolant temperature Tw is low and B is a reference temperature for determining whether the coolant temperature Tw is high. Also, A is lower than B.

In this way, when the coolant temperature Tw is relatively low, the ECU 90 sets the number of pilot injections to a relatively large number, and when the coolant temperature Tw is relatively high, the ECU 90 sets the number of pilot injections to a relatively small number. This is because if the number of pilot injections has been set to a relatively large number and the operating region of the engine shifts to the fuel cut region after a pilot injection is executed, for example, the torque step between the torque generated by a triple pilot injection and the torque during the fuel cut increases to the point where torque shock may occur, and this torque shock may adversely affect drivability. This is because torque shock similar to that generated when fuel starts to be supplied again after a fuel cut is cancelled may be generated.

However, when the coolant temperature Tw is relatively low, the amount of friction is relatively large, and this friction acts as a large resistance against the torque generated by the pilot injections. Accordingly, even if the number of pilot injections is relatively large, the torque step described above can be kept relatively small.

If, on the other hand, the coolant temperature Tw is relatively high, the amount of friction is relatively small so the resistance against the torque generated by the pilot injections is marginal. Accordingly, if the number of pilot injections is relatively large when the coolant temperature Tw is relatively high, the torque generated by the pilot injections may greatly affect the driving of the diesel engine 60 and the torque step described above may increase. Therefore, as shown in FIG. 4B, when the coolant temperature Tw is high, the number of pilot injections is reduced, and when the coolant temperature Tw is low, the number of pilot injections is increased. Accordingly, both torque shock and the amount of HC produced can be suppressed.

Also, because torque shock and the amount of HC produced can be suppressed using an existing engine system, an increase in cost can also be suppressed. Further, as the injection quantities of the pilot injections are set to the minimum injectable quantities and torque shock is suppressed, the number of pilot injections can be set to the maximum limit, so fuel consumption can be improved.

Figure 5:
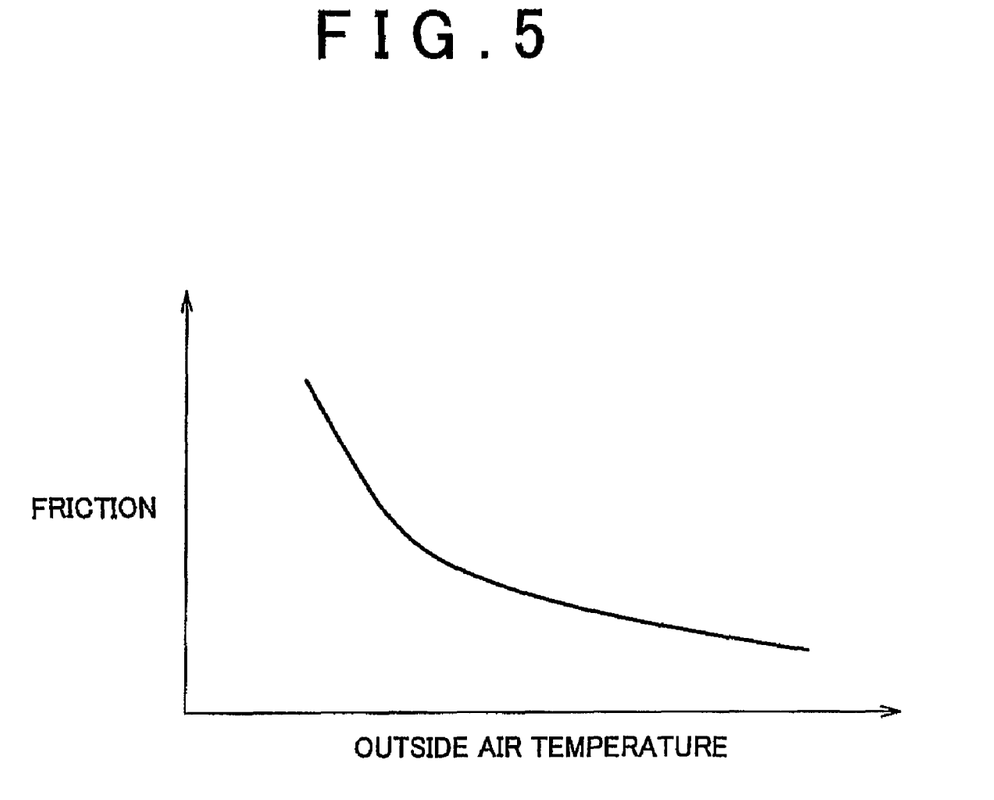
FIG. 5 is a chart showing a case in which the number of pilot injections is determined according to the outside air temperature.

Next, a first modified example of the routine for determining the number of pilot injections will be described. FIG. 5 is a graph showing the relationship between friction and outside air temperature in a case in which the number of pilot injections is determined based on the outside air temperature. The ECU 90 may also determine the number of pilot injections based on only the outside air temperature. This is because the temperature of the diesel engine 60 is low when the outside air temperature is low so friction will most likely increase in this case. For example, an outside air sensor, not shown, may be provided and the ECU 90 may determine the number of pilot injections based on the output from this outside air temperature sensor. Also, the ECU 90 may similarly determine the number of pilot injections based on the temperature as detected by an oil temperature sensor, not shown, that detects the temperature of lubrication oil.

Figure 6A:
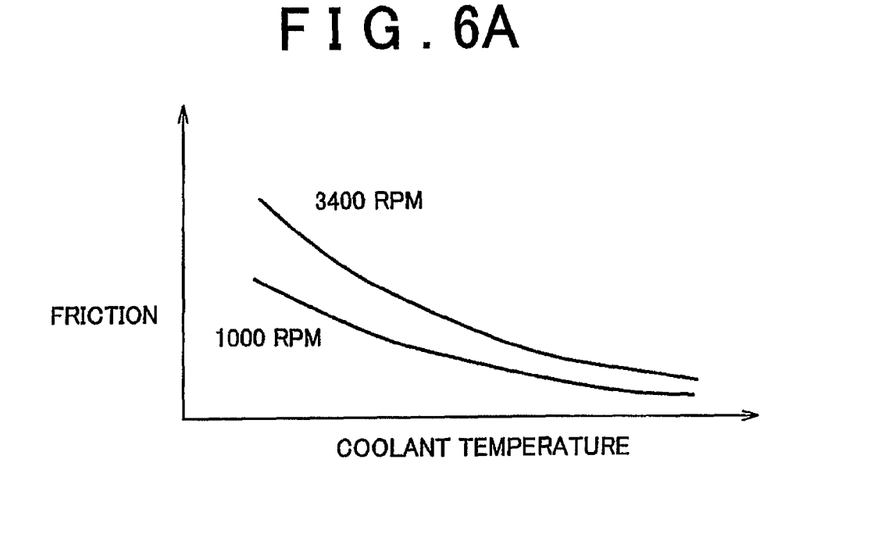
FIGS. 6A and 6B are views showing a case in which the number of pilot injections is determined according to the engine speed.
Figure 6B:
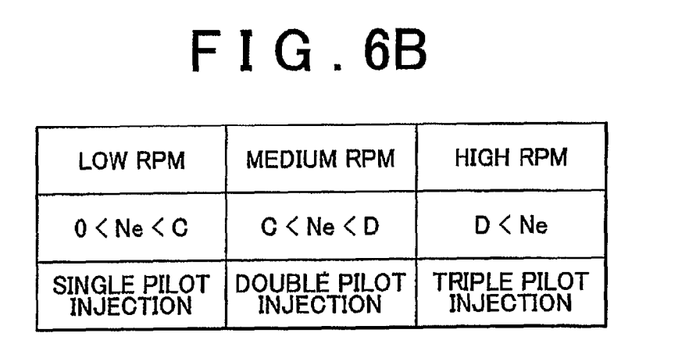

Next, a second modified example of the routine for determining the number of pilot injections will be described. FIGS. 6A and 6B are views showing a case in which the number of pilot injections is determined according to the engine speed Ne. FIG. 6A is a graph showing the relationship between the friction of the diesel engine 60 and the engine coolant temperature Tw at two different engine speeds Ne, i.e., 3400 rpm and 1000 rpm. As shown by the graph, the friction increases more at the higher engine speed Ne.

FIG. 6B is a chart showing the number of pilot injections determined according to the engine speed Ne. If the engine speed Ne is lower than C, the ECU 90 determines the engine speed Ne to be low and sets the number of pilot injections to one. If the engine speed Ne is higher than C but lower than D, the ECU 90 determines the engine speed Ne to be medium and sets the number of pilot injections to two. If the engine speed Ne is higher than D, the ECU 90 determines the engine speed Ne to be high and sets the number of pilot injections to three. Incidentally, C is a reference temperature for determining whether the engine speed Ne is low and D is a reference temperature for determining whether the engine speed Ne is high. Also, C is lower than D.

In this way, when the engine speed Ne is low, the ECU 90 reduces the number of pilot injections, and when the engine speed Ne is high, the ECU 90 increases the number of pilot injections. As a result, both torque shock and the amount of HC produced can be suppressed.

Figure 7:
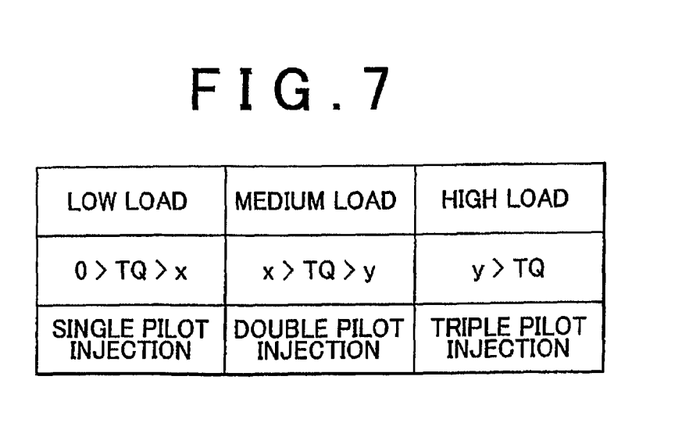
FIG. 7 is a chart showing a case in which the number of pilot injections is determined according to the engine coolant temperature and the engine load.

Next, a third modified example of the routine for determining the number of pilot injections will be described. FIG. 7 is a chart showing a case in which the number of pilot injections is determined according to the engine coolant temperature Tw and the engine load. First, the ECU 90 determines the number of pilot injections based on the coolant temperature Tw, as shown in FIGS. 4A and 4B. Then the ECU 90 determines the number of pilot injections based on the load torque TQ detected by the torque meter 74. Next, the ECU 90 determines the higher of the two, i.e., the higher of the number of pilot injections determined based on the coolant temperature Tw and the number of pilot injections determined based on the load torque TQ, as the number of pilot injections to ultimately be performed. Incidentally, the load torque TQ is the torque that acts on the diesel engine 60 during a fuel cut.

In determining the number of pilot injections based on the engine load, when the engine load TQ is between 0 and x, the ECU 90 determines the load torque to be low and sets the number of pilot injections to one. When the engine load TQ is between x and y, the ECU 90 determines the load torque to be moderate and sets the number of pilot injections to two. When the engine load TQ is lower than y, the ECU 90 determines the load torque to be high and sets the number of pilot injections to three. Incidentally, both x and y are negative values, with y being less than x.

In this way, when the load torque TQ is small, the ECU 90 decreases the number of pilot injections, and when the load torque TQ is large, the ECU 90 increases the number of pilot injections. This is because when the load torque is large, it cancels out the output torque generated by the pilot injection performed after a fuel cut is cancelled, even if that output torque is large, so the torque step will not be large. As a result, the number of pilot injections can be set to the maximum limit, thereby minimizing the amount of HC that is produced, while taking drivability into consideration.

Figure 8:
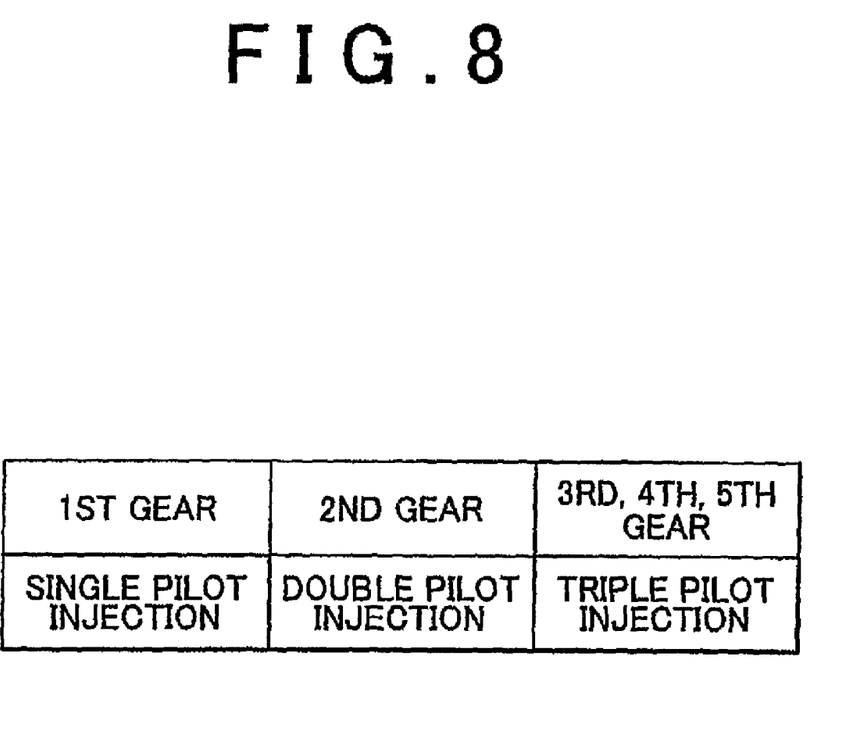
FIG. 8 is a chart showing a case in which the number of pilot injections is determined according to the gear ratio.

Next, a fourth modified example of the routine for determining the number of pilot injections will be described. FIG. 8 is a chart showing a case in which the number of pilot injections is determined according to the gear ratio. The ECU 90 detects the current gear ratio from the gearshift position sensor 75. When the gearshift is in a position corresponding to first (1st) gear, the ECU 90 determines the gear ratio to be large and sets the number of pilot injections to one. When the gearshift is in a position corresponding to second (2nd) gear, the ECU 90 determines the gear ratio to be somewhere in the middle and sets the number of pilot injections to two. When the gearshift is in a position corresponding to third gear or higher (i.e., 3rd, 4th, or 5th), the ECU 90 determines the gear ratio to be small and sets the number of pilot injections to three.

In this way, when the gear ratio is small, the ECU 90 increases the number of pilot injections, and when the gear ratio is large, the ECU 90 decreases the number of pilot injections. This is because the driver will feel less torque shock when the gear ratio is small as opposed to when the gear ratio is large, as well as because the shift shock becomes significant when the gear ratio is large. Therefore, both torque shock and the amount of HC produced can be suppressed.

Next, an engine system according to a second example embodiment of the invention will be described. The structure of the engine system according to the second example embodiment is generally the same as the engine system according to the first example embodiment so a description thereof will be omitted.

When the operating region of the engine shifts from a fuel cut region in which no fuel is injected to a low load region in which only a small amount of fuel is injected, or visa versa, the ECU 90 of the engine system according to this second example embodiment executes at least one pilot injection ahead of a main injection in the low load region, and controls the opening amount of the variable nozzle 43 of the turbocharger to increase the back pressure when the operating region of the engine shifts. Hereinafter, a routine for controlling the variable nozzle in this way (i.e., a variable nozzle control routine) will be described.

Figure 9:
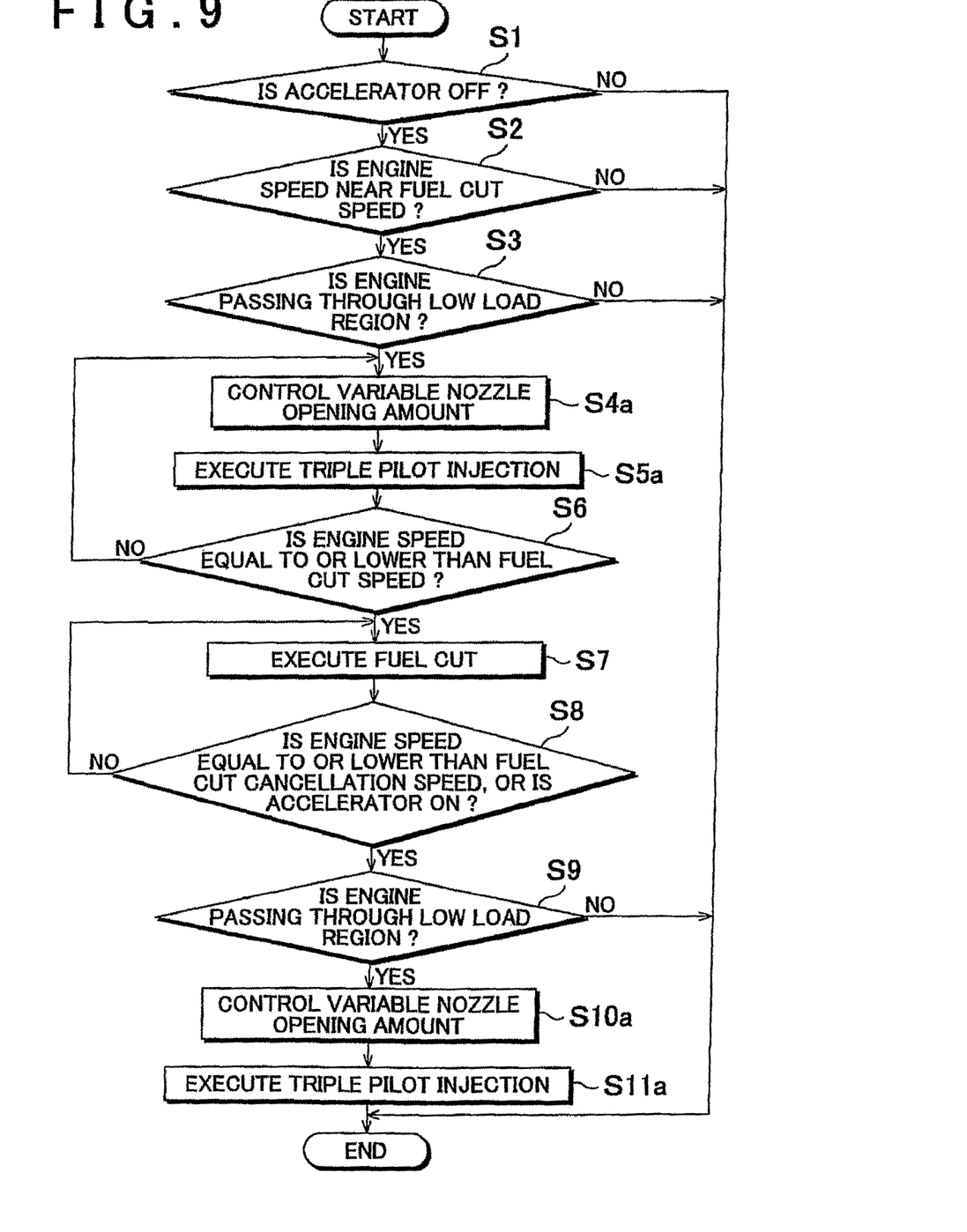
FIG. 9 is a flowchart illustrating an example of a variable nozzle control routine executed by an ECU according to a second example embodiment of the invention.

FIG. 9 is a flowchart illustrating an example of the variable nozzle control routine executed by the ECU according to the second example embodiment. Descriptions of steps in this routine that are similar to steps in the routine for determining the number of pilot injections will be omitted.

If the engine is passing through the low load region (i.e., Yes in step S3 or Yes in step S9), the ECU 90 controls the variable nozzle 43 to a predetermined opening amount (steps S4a and S10a). Next, the ECU 90 sets the number of pilot injections to the maximum limit of three and executes them (steps S5a and S11a).

Figure 10:
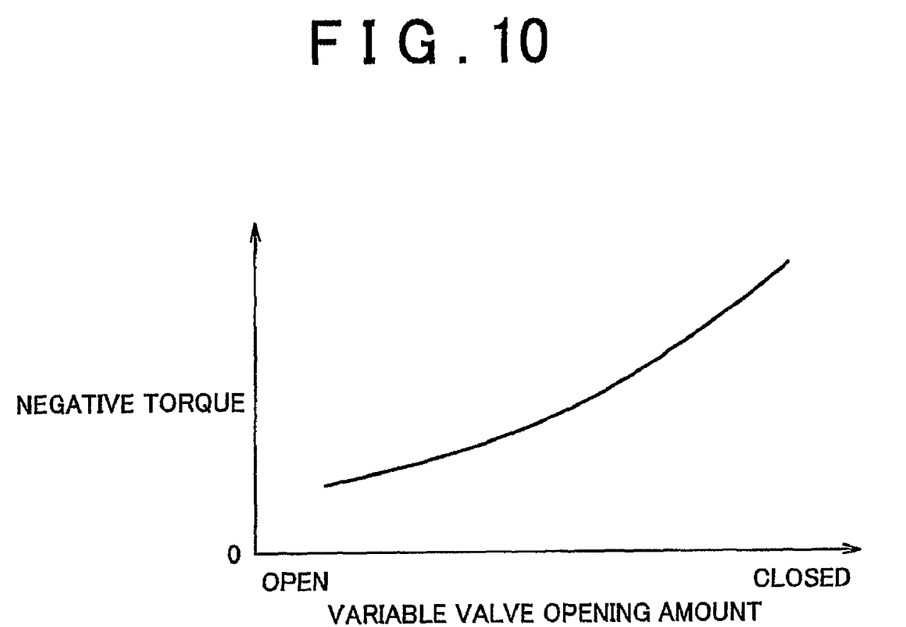
FIG. 10 is a graph showing the relationship between the opening amount of the variable nozzle and negative torque acting on a diesel engine.

Next, the relationship between the opening amount of the variable nozzle 43 and negative torque acting on the diesel engine 60 will be described with reference to FIG. 10 which is a graph showing this relationship. The opening amount of the variable nozzle 43 is smaller farther toward the right in FIG. 10. Therefore, FIG. 10 shows that the absolute value of the negative torque acting on the diesel engine 60 increases as the opening amount of the variable nozzle 43 becomes smaller (i.e., as the variable nozzle 43 closes). This is because when the opening amount of the variable nozzle 43 is smaller, the back pressure increases. As a result, the intake air amount decreases, which acts as negative torque against the output from the pilot injection.

Accordingly, when the negative torque is large, the torque shock is suppressed even if the number of pilot injections is relatively large. Therefore, the ECU 90 reduces the opening amount of the variable nozzle 43 and executes three pilot injections, thus suppressing both torque shock and the amount of HC produced.

While example embodiments of the invention have been illustrated above, it is to be understood that the invention is not limited to details of the illustrated embodiments, but may be embodied with various changes, modifications or improvements without departing from the scope of the invention.

The invention is particularly suitable for use with a diesel engine having a small compression ratio, such as diesel engine with a compression ratio of 15.8 or less. This is because when the compression ratio is small, the temperature of the intake air does not rise that much from compression so the temperature in the cylinder does not easily rise, and as a result, combustion becomes unstable such that a large amount of HC is produced.

Also, an outside air pressure sensor may be provided and the routine for determining the number of pilot injections or the like may be executed only when the air pressure is equal to or less than a predetermined air pressure which is lower than a reference air pressure. This is because when the air pressure is low, the intake air amount decreases so the temperature in the cylinder does not easily rise.

Also, the number of pilot injections may also be determined based on the engine speed and the engine load. For example, the number of pilot injections may be determined according to the engine speed, and again according to the engine load, as shown in FIGS. 6A, 6B, and 7, and the largest number of pilot injections from among those may be ultimately set as the number of pilot injections.

The invention claimed is:

1. A fuel injection control apparatus for a compression ignition internal combustion engine, which can perform a fuel injection divided into a plurality of injections, comprising:
   a pilot injection control apparatus which, when an operating region of the internal combustion engine shifts from a fuel cut region in which no fuel is injected to a low load region in which a small amount of fuel is injected, or visa versa, executes at least one pilot injection ahead of a main injection in the low load region,
   wherein the pilot injection control apparatus sets the number of pilot injections to be larger the higher the engine speed is.

2. The fuel injection control apparatus according to claim 1, characterized in that the pilot injection control apparatus determines the number of pilot injections according to at least one from among an engine temperature, and an engine load.

3. The fuel injection control apparatus according to claim 2, characterized in that the pilot injection control apparatus sets the number of pilot injections to be larger the lower the engine temperature is.

4. The fuel injection control apparatus according to claim 2, characterized in that the pilot injection control apparatus sets the number of pilot injections to be larger the larger the engine load of the internal combustion engine is.

5. The fuel injection control apparatus according to claim 2, characterized in that the engine temperature is estimated according to at least one from among an engine coolant temperature, an engine lubrication oil temperature, and an outside air temperature.

6. The fuel injection control apparatus according to claim 1, characterized by further comprising:
   a variable nozzle control apparatus that controls an opening amount of a variable nozzle of a supercharger to increase back pressure when the operating region of the internal combustion engine shifts.

7. The fuel injection control apparatus according to claim 1, characterized in that the pilot injection control apparatus determines the number of pilot injections according to a gear ratio of the transmission.

8. The fuel injection control apparatus according to claim 1, wherein the pilot injection control apparatus sets the injection quantity of each pilot injection to the minimum injectable quantity.

9. The fuel injection control apparatus according to claim 1, wherein the pilot injection control apparatus sets the injection timing of a main injection or a pilot injection, which is executed immediately following the pilot injection, to a timing at which the amount of HC produced is minimal, taking into account the injection timing of the pilot injection that is executed right before the main injection or the pilot injection.

10. A fuel injection control method for a compression ignition internal combustion engine, which can perform a fuel injection divided into a plurality of injections, comprising:
    executing, when an operating region of the internal combustion engine shifts from a fuel cut region in which no fuel is injected to a low load region in which a small amount of fuel is injected, or visa versa, at least one pilot injection ahead of a main injection in the low load region;
    setting the number of pilot injections to be larger the higher the engine speed (Ne) is; and
    executing the main injection after the determined number of pilot injections has been executed.

11. The fuel injection control method according to claim 10, wherein the number of pilot injections is determined according to at least one from among an engine temperature and an engine load.

12. The fuel injection control method according to claim 10, further comprising:
    controlling an opening amount of a variable nozzle of a supercharger to increase back pressure when the operating region of the internal combustion engine shifts.

13. The fuel injection control method according to claim 10, wherein the injection quantity of each of the pilot injections is set to the minimum injectable quantity.

14. The fuel injection control method according to claim 10, wherein the injection timing of a main injection or a pilot injection, which is executed immediately following the pilot injection, is set to a timing at which the amount of HC produced is minimal, taking into account the injection timing of the pilot injection that is executed right before the main injection or the pilot injection.

15. A fuel injection control apparatus for a compression ignition internal combustion engine, which can perform a fuel injection divided into a plurality of injections, comprising:
    a pilot injection control apparatus which, when an operating region of the internal combustion engine shifts from a fuel cut region in which no fuel is injected to a low load region in which a small amount of fuel is injected, or visa versa, executes at least one pilot injection ahead of a main injection in the low load region,
    wherein the pilot injection control apparatus sets the number of pilot injections to be larger the smaller the gear ratio of the transmission is.

16. The fuel injection control apparatus according to claim 15, wherein the pilot injection control apparatus determines the number of pilot injections according to at least one from among an engine temperature and an engine load.

17. The fuel injection control apparatus according to claim 16, wherein the pilot injection control apparatus sets the number of pilot injections to be larger the lower the engine temperature is.

18. The fuel injection control apparatus according to claim 16, wherein the pilot injection control apparatus sets the number of pilot injections to be larger the larger the engine load of the internal combustion engine is.

19. The fuel injection control apparatus according to claim 16, wherein the engine temperature is estimated according to at least one from among an engine coolant temperature, an engine lubrication oil temperature, and an outside air temperature.

20. The fuel injection control apparatus according to claim 15, further comprising:
    a variable nozzle control apparatus that controls an opening amount of a variable nozzle of a supercharger to increase back pressure when the operating region of the internal combustion engine shifts.

21. The fuel injection control apparatus according to claim 15, wherein the pilot injection control apparatus sets the injection quantity of each pilot injection to the minimum injectable quantity.

22. The fuel injection control apparatus according to claim 15, wherein the pilot injection control apparatus sets the injection timing of a main injection or a pilot injection, which is executed immediately following the pilot injection, to a timing at which the amount of HC produced is minimal, taking into account the injection timing of the pilot injection that is executed right before the main injection or the pilot injection.

23. A fuel injection control method for a compression ignition internal combustion engine, which can perform a fuel injection divided into a plurality of injections, characterized by comprising:

executing, when an operating region of the internal combustion engine shifts from a fuel cut region in which no fuel is injected to a low load region in which a small amount of fuel is injected, or visa versa, at least one pilot injection ahead of a main injection in the low load region;

setting the number of pilot injections to be larger the smaller the gear ratio of the transmission is; and executing the main injection after the determined number of pilot injections has been executed.

24. The fuel injection control method according to claim 23, wherein the number of pilot injections is determined according to at least one from among an engine temperature and an engine load.

25. The fuel injection control method according to claim 23, further comprising:

controlling an opening amount of a variable nozzle of a supercharger to increase back pressure when the operating region of the internal combustion engine shifts.

26. The fuel injection control method according to claim 23, wherein the injection quantity of each of the pilot injections is set to the minimum injectable quantity.

27. The fuel injection control method according to claim 23, wherein the injection timing of a main injection or a pilot injection, which is executed immediately following the pilot injection, is set to a timing at which the amount of HC produced is minimal, taking into account the injection timing of the pilot injection that is executed right before the main injection or the pilot injection.

* * * * *

UNITED STATES PATENT AND TRADEMARK OFFICE
CERTIFICATE OF CORRECTION

PATENT NO.       : 7,861,686 B2               Page 1 of 1
APPLICATION NO.  : 12/528865
DATED            : January 4, 2011
INVENTOR(S)      : Seiji Ogura et al.

It is certified that error appears in the above-identified patent and that said Letters Patent is hereby corrected as shown below:

Column 5, line 38 replace "57" with --S7--

Signed and Sealed this
Twentieth Day of September, 2011

David J. Kappos
*Director of the United States Patent and Trademark Office*